(12) United States Patent
de Borchgrave et al.

(10) Patent No.: US 11,633,752 B2
(45) Date of Patent: Apr. 25, 2023

(54) SCRUBBER UNIT FOR A PAINT BOOTH

(71) Applicant: Gallagher-Kaiser Corporation, Troy, MI (US)

(72) Inventors: Adrien de Borchgrave, Plymouth, MI (US); Bruce Roesler, Wixom, MI (US); Larry Cook, Rochester Hills, MI (US); Ken Eisbrenner, Chesterfield, MI (US)

(73) Assignee: GALLAGHER-KAISER CORPORATION, Troy, MI (US)

( * ) Notice: Subject to any disclaimer, the term of this patent is extended or adjusted under 35 U.S.C. 154(b) by 42 days.

(21) Appl. No.: 17/371,169

(22) Filed: Jul. 9, 2021

(65) Prior Publication Data

US 2021/0331194 A1 Oct. 28, 2021

Related U.S. Application Data

(63) Continuation of application No. 16/589,473, filed on Oct. 1, 2019, now Pat. No. 11,084,058.

(60) Provisional application No. 62/739,557, filed on Oct. 1, 2018.

(51) Int. Cl.
| | |
|---|---|
| *B05B 14/468* | (2018.01) |
| *B05C 15/00* | (2006.01) |
| *B01D 47/10* | (2006.01) |
| *B01D 47/02* | (2006.01) |

(52) U.S. Cl.
CPC .......... *B05B 14/468* (2018.02); *B01D 47/025* (2013.01); *B01D 47/10* (2013.01); *B05C 15/00* (2013.01)

(58) Field of Classification Search
None
See application file for complete search history.

(56) References Cited

U.S. PATENT DOCUMENTS

| | | | | |
|---|---|---|---|---|
| 2,981,225 | A | * | 4/1961 | Vatt ........................... B05B 5/14 118/325 |
| 3,934,495 | A | | 1/1976 | Bloomer |
| 4,230,032 | A | * | 10/1980 | Perryman ............... B05B 14/43 118/DIG. 7 |

(Continued)

FOREIGN PATENT DOCUMENTS

| | | |
|---|---|---|
| EP | 0177321 A1 | 4/1986 |
| KR | 20170130970 A | 11/2017 |

OTHER PUBLICATIONS

International Search Report for corresponding International App. No. PCT/US2019/053999 dated Jan. 20, 2020.

*Primary Examiner* — Jethro M. Pence
(74) *Attorney, Agent, or Firm* — Dickinson Wright PLLC (57) ABSTRACT

A paint booth assembly includes a paint booth having a pair of side walls and a flood sheet extending between the pair of side walls to separate the paint booth between a spray portion disposed above the flood sheet and a paint recovery portion disposed below the flood sheet. The flood sheet defines at least one flood sheet opening, and a scrubber unit extends down from the flood sheet opening to establish a shared path of fluid communication of a flow of water from the flood sheet and a downdraft of process air from the spray portion to the paint recovery portion. A scrubber pod is disposed within the scrubber unit and defines a plurality of perforations to induce an initial mixing of the paint particles entrained in the downdraft of process air into the flow of water.

6 Claims, 8 Drawing Sheets

(56) References Cited

U.S. PATENT DOCUMENTS

| | | | |
|---|---|---|---|
| 4,313,369 A * | 2/1982 | Tsuruta | B05B 16/60 165/59 |
| 4,338,364 A * | 7/1982 | Kennon | B05B 16/90 118/316 |
| 4,345,921 A | 8/1982 | Gustavsson et al. | |
| 4,416,193 A * | 11/1983 | Sharpless | B05B 14/46 454/55 |
| 4,425,870 A | 1/1984 | Marshke | |
| 4,440,554 A * | 4/1984 | Perry | B01D 47/027 55/435 |
| 4,521,227 A | 6/1985 | Gerdes et al. | |
| 4,607,592 A * | 8/1986 | Richter | B05B 14/465 118/DIG. 7 |
| 4,687,686 A * | 8/1987 | Stofleth | B05B 16/90 454/52 |
| 4,732,589 A | 3/1988 | Parslow, Jr. | |
| 4,874,412 A * | 10/1989 | Nowack | B01D 46/62 55/440 |
| 4,885,010 A * | 12/1989 | Rich | B01D 47/024 96/272 |
| 5,020,470 A * | 6/1991 | West | B05B 14/46 96/322 |
| 5,023,116 A * | 6/1991 | Williams | B05B 16/60 118/DIG. 7 |
| 5,107,756 A * | 4/1992 | Diaz | B05B 16/90 454/53 |
| 5,147,422 A * | 9/1992 | Neeley | B05B 14/468 454/52 |
| 5,162,132 A * | 11/1992 | Diaz | B05B 16/40 427/478 |
| 5,288,324 A * | 2/1994 | Shaneyfelt | B05B 16/40 118/501 |
| 5,360,539 A | 11/1994 | Josefsson | |
| 5,425,670 A * | 6/1995 | Josefsson | B05B 14/46 454/52 |
| 5,591,240 A * | 1/1997 | Ophardt | B05B 14/43 55/288 |
| 5,720,811 A * | 2/1998 | Eder | B05B 14/43 118/326 |
| 5,766,355 A * | 6/1998 | Josefsson | B05B 16/60 454/50 |
| 5,906,078 A * | 5/1999 | Cramer | E04H 5/02 52/63 |
| 6,024,796 A * | 2/2000 | Salazar | B05B 14/46 96/322 |
| 6,093,250 A * | 7/2000 | Salazar | B05B 14/46 96/322 |
| 6,228,154 B1 | 5/2001 | Pakkala et al. | |
| 6,264,745 B1 * | 7/2001 | Diaz | B05B 14/43 454/53 |
| 6,752,854 B1 * | 6/2004 | Varone | B01D 53/504 96/275 |
| 6,772,753 B2 * | 8/2004 | Roesler | F26B 25/009 126/312 |
| 6,820,501 B2 * | 11/2004 | Roesler | G01L 13/02 73/861.66 |
| 7,063,528 B2 * | 6/2006 | Klobucar | F26B 23/02 432/147 |
| 7,988,769 B2 * | 8/2011 | Wieland | B05B 16/60 454/55 |
| 8,241,405 B2 * | 8/2012 | Salazar | B05B 14/468 95/219 |
| 8,241,406 B2 * | 8/2012 | Weschke | B05B 14/437 95/286 |
| 8,377,177 B2 * | 2/2013 | Holzheimer | G01F 23/263 96/373 |
| 8,584,616 B2 * | 11/2013 | Fritz | C09D 7/71 118/308 |
| 8,801,820 B2 * | 8/2014 | Iwakiri | B05B 14/437 96/372 |
| 8,813,679 B2 | 8/2014 | Imano et al. | |
| 9,643,118 B2 * | 5/2017 | Wieland | B05B 14/435 |
| 10,857,494 B2 * | 12/2020 | Salazar | B01D 47/00 |
| 11,084,058 B2 * | 8/2021 | de Borchgrave | B01D 47/025 |
| 2005/0087073 A1 * | 4/2005 | d'Altena | B01D 47/06 96/245 |
| 2007/0095279 A1 * | 5/2007 | Langeman | B05B 16/40 454/50 |
| 2010/0203261 A1 * | 8/2010 | Kirk | B05B 15/80 427/559 |
| 2013/0122188 A1 * | 5/2013 | Fritz | B08B 3/024 118/326 |
| 2017/0209891 A1 * | 7/2017 | Wieland | B01D 46/71 |
| 2021/0331194 A1 * | 10/2021 | de Borchgrave | B05C 15/00 |
| 2022/0184651 A1 * | 6/2022 | de Borchgrave | B01D 46/0006 |

* cited by examiner

SCRUBBER UNIT FOR A PAINT BOOTH

CROSS-REFERENCE TO RELATED APPLICATIONS

This application is a continuation of U.S. application Ser. No. 16/589,473, filed on Oct. 1, 2019, which claims the benefit of U.S. Provisional Patent Application Ser. No. 62/739,557 filed on Oct. 1, 2018, the entire disclosures of which are incorporated herein by reference.

BACKGROUND OF THE INVENTION

1. Field of the Invention

The subject disclosure relates in general to the field of paint booths, and more particularly to a scrubber unit for capturing and removing paint particles from a downdraft of process air in a paint booth.

2. Description of the Prior Art

This section provides background information related to the present invention which is not necessarily prior art.

Efficiency of capturing and removing paint particles from a downdraft of process air in a paint booth continues to provide challenges for paint booth design. For example, a scrubber unit for a paint booth is ideally designed to capture and remove nearly all of the paint particles from the downstream of process air, such that non-captured paint particles do not escape the scrubber and reach disposable air filters. A measure used to describe the amount of paint particles that escape a scrubber unit and thus need to be captured by a filter is grains/1000 CFM (a grain being a unit of mass wherein 1 pound is equal to 7000 grains). Different manufacturers have different efficiency targets, yet prior commercially viable designs have failed to reduce paint particle escape from the scrubber unit down to below 1.25 grains/1000 CFM of air flow. Poor capture of paint particles with a scrubber unit means that more disposable filters need to be used and regularly replaced relative to a more efficient system in order to reduce pollution and meet the air safety standards required for paint booths. Further, replacing filters in paint booths has a labor cost that rises as filters need to be replaced more often. Therefore, it is a goal of scrubber unit design to reduce the number of filters that need to be replaced by increasing the recovery of paint particles by the scrubber unit.

U.S. Pat. No. 5,020,470 discloses a paint booth assembly including such a scrubber unit for capturing and removing paint particles from a downdraft of air. The paint booth assembly includes a paint booth having a pair of side walls, and a flood sheet extending between the pair of side walls to separate the paint booth between a spray portion disposed above the flood sheet and a paint recovery portion disposed below the flood sheet. The flood sheet defines at least one flood sheet opening for receiving both a flow of water from the flood sheet and a downdraft of process air including entrained paint particles from the spray portion. The paint booth assembly further includes a scrubber unit that extends downwardly from the at least one flood sheet opening to establish a shared path of fluid communication of the flow of water and the downdraft of process air from the spray portion to the paint recovery portion.

However, as previously mentioned, commercially viable scrubber units, such as the one disclosed in U.S. Pat. No. 5,020,470, have been unable to reduce paint particle escape down to below 1.25 grains/1000 CFM of air flow while also having commercially viable energy usage requirements. As will be appreciated, a scrubber unit capable of meeting this high efficiency standard improves not only the performance, but also the cost efficiency for the paint booth, by reducing consumable, energy, and assembly costs. Accordingly, a continuing need exists for providing a paint booth with improved, and more efficient, scrubber units.

SUMMARY OF THE INVENTION

This section provides a general summary of the invention and is not intended to be a comprehensive disclosure of its full scope, aspects, objectives, and/or all of its features.

A paint booth assembly according to the subject disclosure includes a scrubber pod disposed within a scrubber unit. The scrubber pod defines a plurality of perforations to induce an initial mixing of the paint particles entrained in the downdraft of process air into the flow of water. Put another way, the scrubber pod improves mixing of the paint particles in the process air into the flow of water by forcing the paint particles and flow of water into closer proximity with one another as they collectively pass through the perforations defined by the scrubber pod. The plurality of perforations create a pressure drop that helps pull water particles apart and increases the proportion that those smaller water particles will contact paint particles, thus inducing the initial mixing the paint particles into the flow of water. Ultimately, the improved mixing of the paint particles into the water contributes to a more efficient paint particle capture, and this leads to an improved cost efficiency for the scrubber unit as filters do not need to be replaced as often. More specifically, testing of the paint booth assembly according to the subject design, and with incorporation of the scrubber pod, has advantageously and consistently achieved results of limiting paint escape to below 1.25 grains/1000 CFM (grains (mass) per thousand cubic feet of airflow per minute).

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure.

Figure 1:
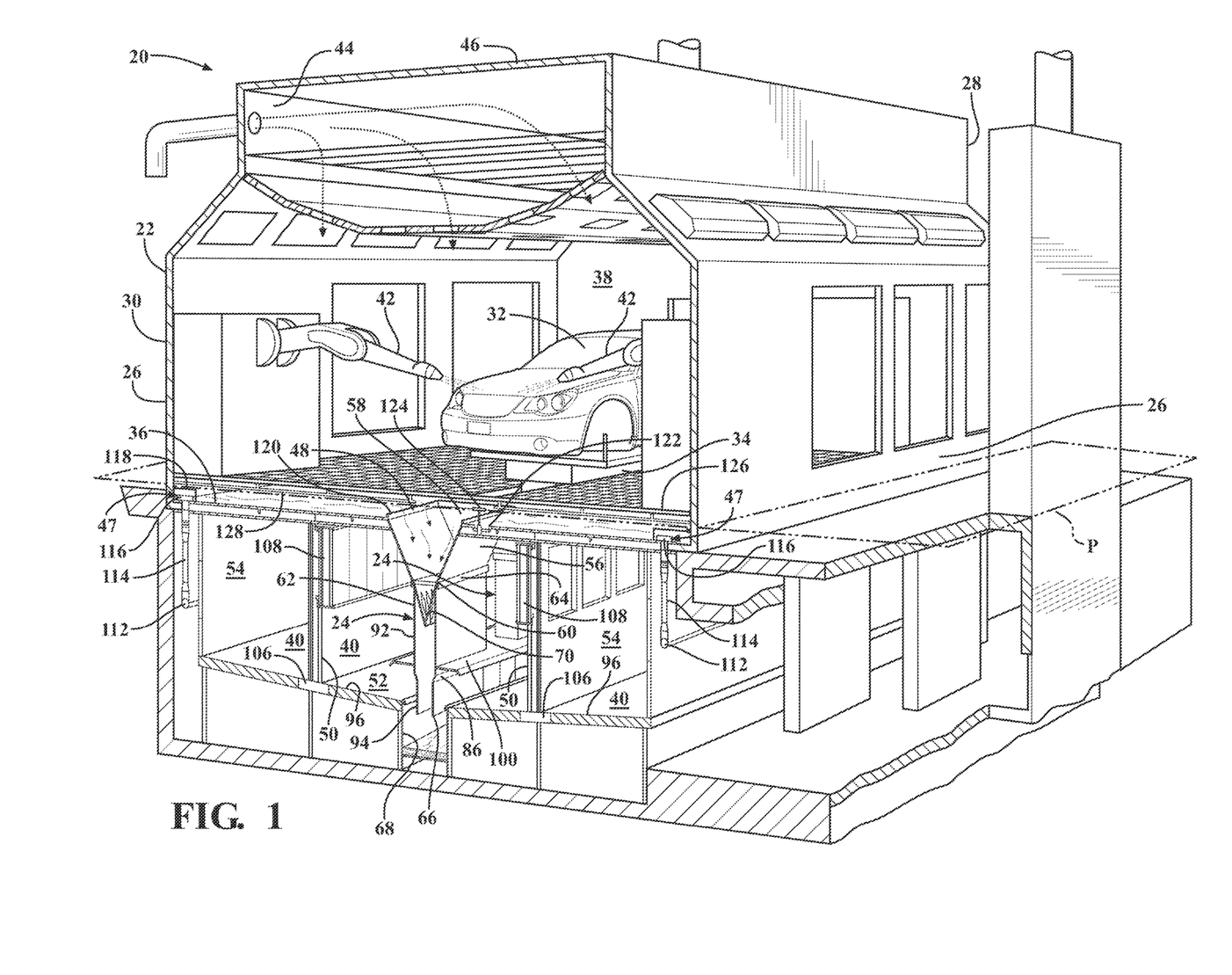
FIG. 1 is a perspective cross-sectional view of a paint booth assembly illustrating a scrubber unit extending downwardly from at least one flood sheet opening of a flood sheet.
Figure 2:
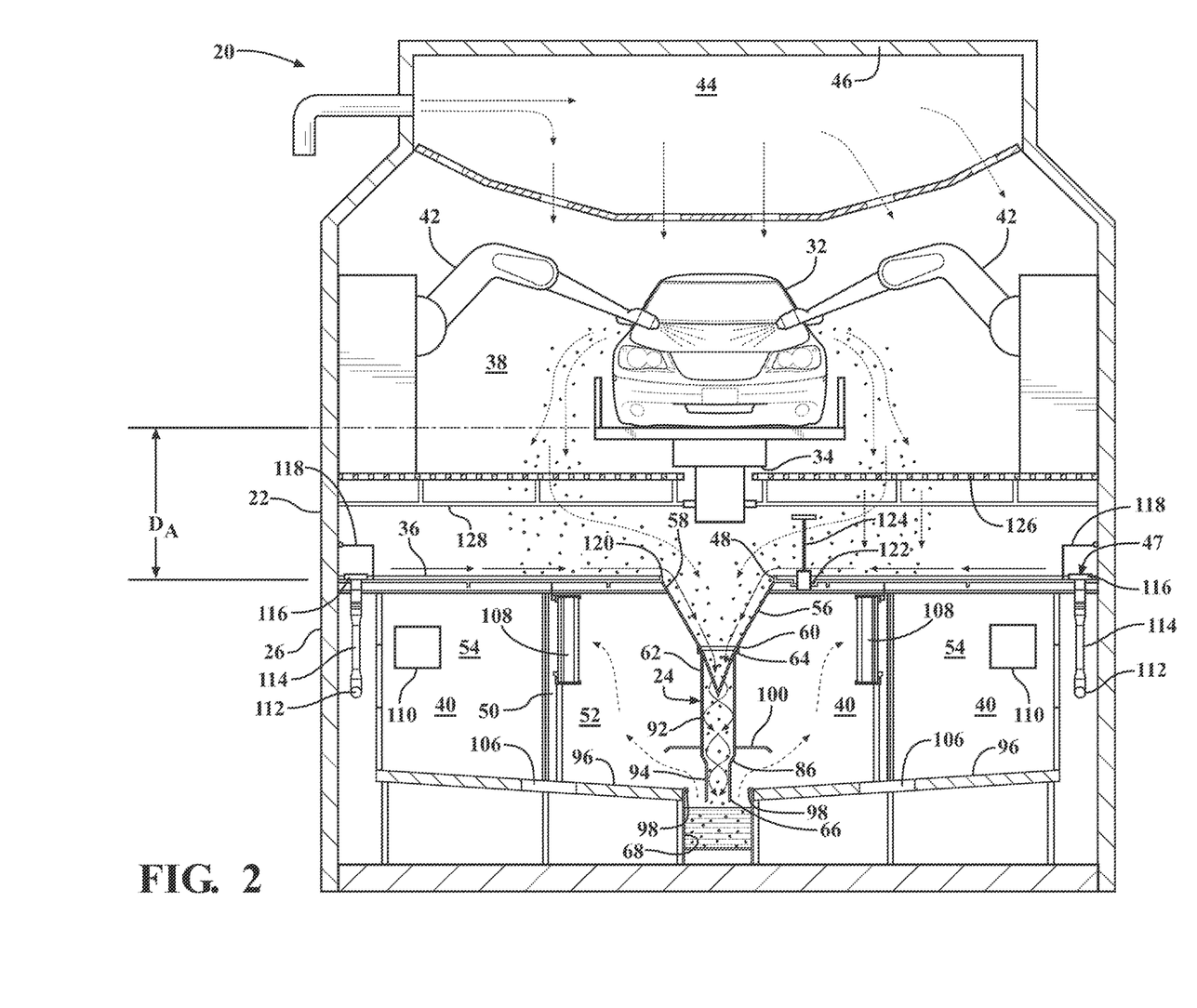
FIG. 2 is an end view of the paint booth assembly illustrating a shared path of fluid communication of a flow of water from the flood sheet and a downdraft of process air from a spray portion to a paint recovery portion of the paint booth.

Referring to the drawings, wherein like numerals indicate corresponding parts throughout the several views, a paint booth assembly 20 is generally shown in FIGS. 1-2 and includes a paint booth 22 including at least one scrubber unit 24 for removing paint particles from a downdraft of air in the paint booth 22. The paint booth 22 includes a pair of side walls 26 that extend from an entry end 28 to an exit end 30 for receiving a vehicle 32 to be painted. A conveyor 34 is located centrally between the pair of side walls 26 and extends from the entry end 28 to the exit end 30 to convey the vehicle 32 to be painted along the paint booth 22. A flood sheet 36 extends between the pair of side walls 26 to separate the paint booth 22 between a spray portion 38 disposed above the flood sheet 36 and a paint recovery portion 40 disposed below the flood sheet 36.

As best illustrated in FIG. 1, a number of paint applicators 42 are ultimately placed in the paint booth 22 to apply paint particles to the vehicle 32. For example, the paint applicators 42 can include rotary-bell-type paint applicators and/or robot-arm-type paint applicators. As is known in the art, the paint applicators 42 can include a pair of paint applicators 42 that are typically placed on opposite sides of the conveyor 34 to allow the vehicle 32 to be painted from opposite sides at the same time. A plenum 44 extends along a top portion 46 of the paint booth 22 to introduce a downdraft of air into the spray portion 38 of the paint booth 22 to capture and direct an overspray of paint particles that are not applied to the vehicle 32 in a downdraft of process air from the spray portion 38 towards the paint recovery portion 40. A water distribution system 47 is placed in communication with the spray portion 38 to introduce a supply of flowing water across the flood sheet 36 and passing underneath the conveyed vehicle 32 to capture paint particles which escape from the downdraft of process air, and also contribute to a clean environment in the paint booth 22. The flood sheet 36 is generally flat to aid in even water distribution and cleaning operations for the paint booth 22.

Figure 6:
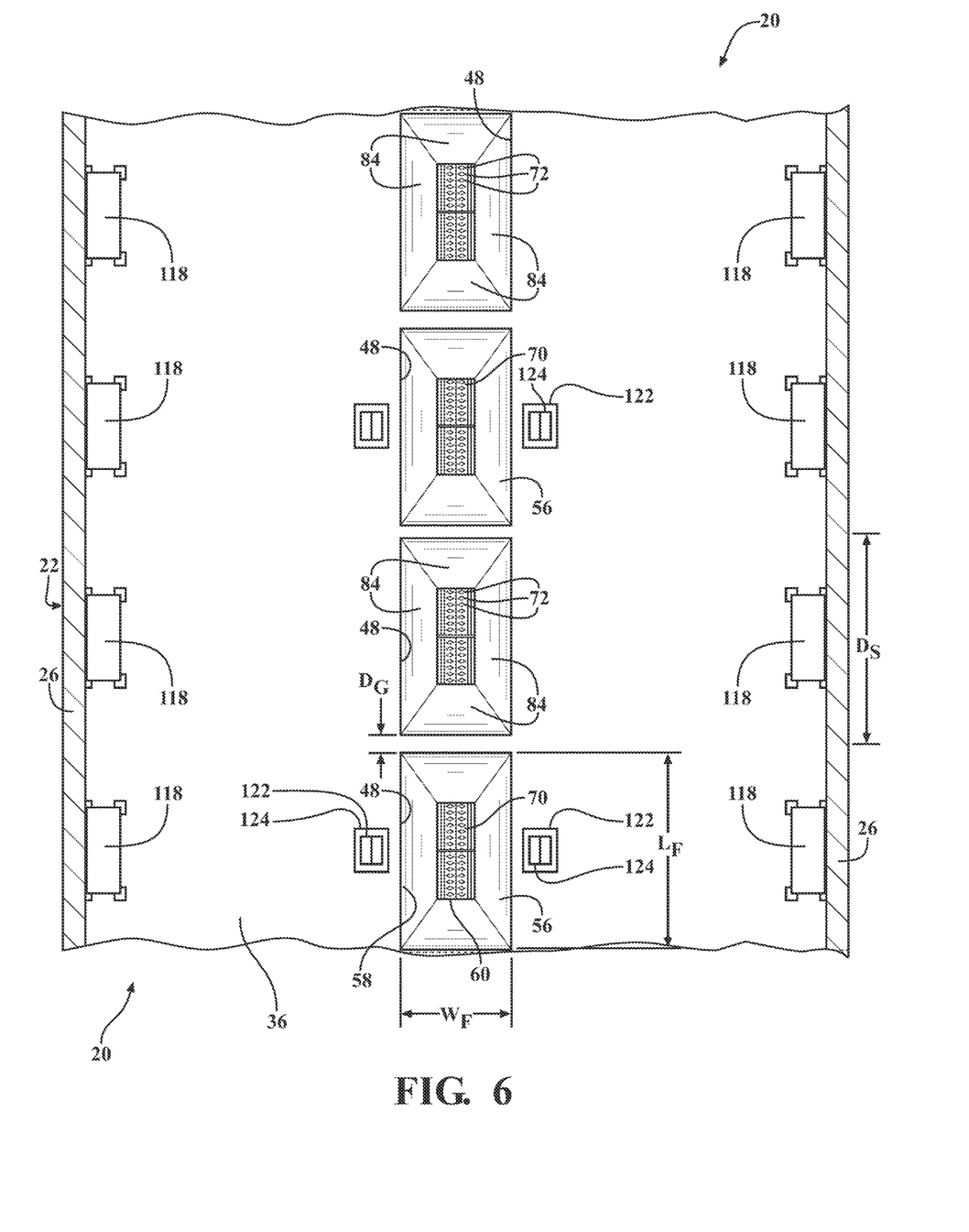
FIG. 6 is a partial cross-sectional top view of the paint booth assembly as shown in FIG. 1 taken along plane P.

The flood sheet 36 includes at least one flood sheet opening 48 receiving both the flow of water from the flood sheet 36 and the downdraft of process air. As best illustrated in FIG. 6, in a preferred embodiment, the at least one flood sheet opening 48 includes a plurality of flood sheet openings 48 extending in a spaced and generally aligned relationship relative to one another between the entry and exit ends 28, 30 of the paint booth 22. The flood sheet openings 48 each preferably have a flood sheet length $L_F$ of approximately 4 feet 7 inches in length, a flood sheet width $W_F$ of approximately 3 feet 2 inches in width, and are separated by a gap distance $D_G$ of approximately 5 inches such that a flood sheet opening 48 is placed every five feet from the entry end 28 to the exit end 30. In a preferred embodiment of the paint booth assembly 22, at full capacity, approximately 6,000 CFM of air will pass through each flood sheet opening 48.

Figure 3:
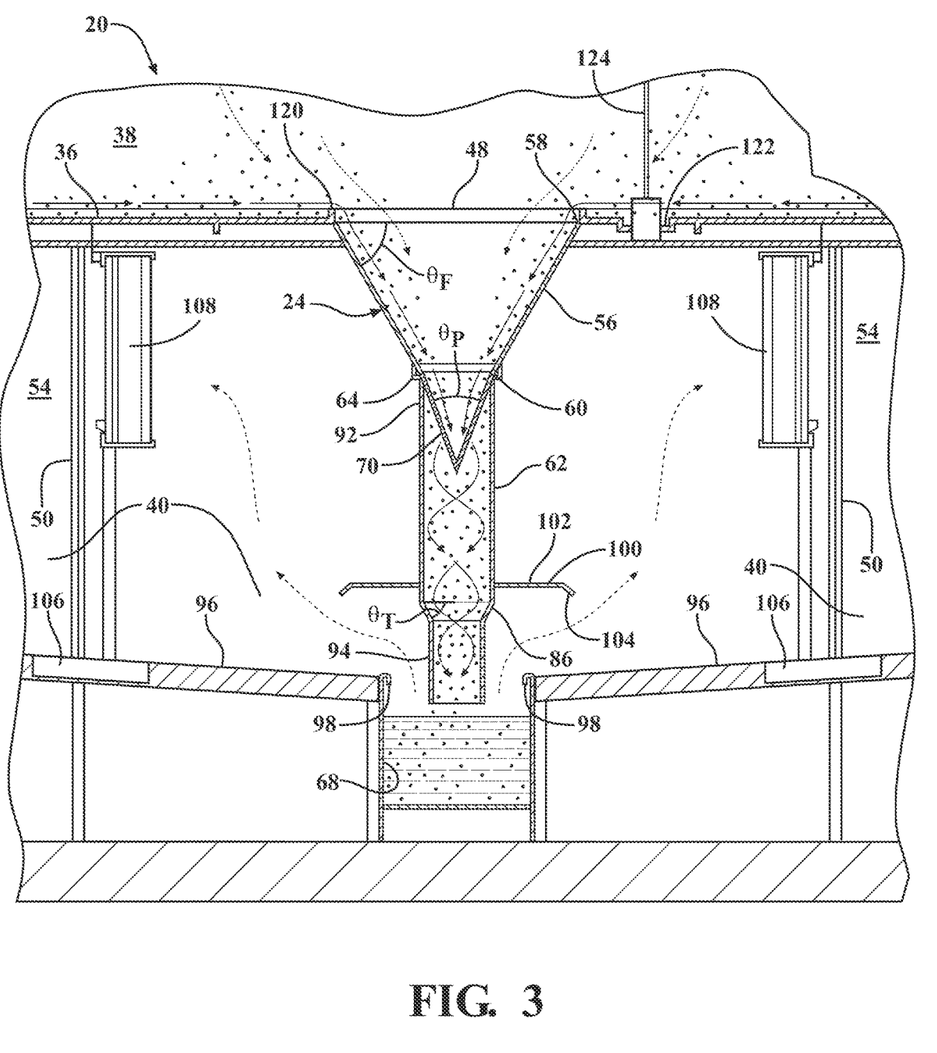
FIG. 3 is a magnified view of a portion of FIG. 2 illustrating a mixing chute extending downwardly from a mixing chute mouth disposed adjacent the at least one flood sheet opening to a mixing chute exit for establishing a residence time of the shared path of fluid communication within the scrubber unit, and a scrubber pod disposed within and adjacent the mixing chute mouth to induce an initial mixing of the paint particles into the flow of water.

As best illustrated in FIGS. 1-2, a pair of dividing walls 50 extend down from the flood sheet 36 and are disposed in spaced relationship with one another on opposing sides of the flood sheet openings 48 to separate the paint recovery portion 40 into a wet chamber 52 disposed between the pair of dividing walls 50 and a pair of exhaust chambers 54 disposed between the side walls 26 and the dividing walls 50. A scrubber unit 24 extends down from each flood sheet opening 48 to establish a shared path of fluid communication of the flow of water and the downdraft of process air from the spray portion 38 to the wet chamber 52 for a predetermined residence time that provides for mixing the paint particles entrained in the process air into the flow of water. As best shown in FIGS. 2 and 3, each scrubber unit 24 includes a funnel 56 that extends down from a funnel mouth 58 disposed adjacent one of the flood sheet openings 48 to a funnel exit 60. The scrubber unit 24 includes a mixing chute 62 that extends down from a mixing chute mouth 64 that is connected to the funnel exit 60 to a mixing chute exit 66 in fluid communication with the wet chamber 52 to define the predetermined residence time of the shared path of fluid communication within the scrubber unit 24. A trough 68 is located in the wet chamber 52 below and in aligned relationship with the mixing chute exits 66, with the mixing chute exits 66 each preferably extending partially into the trough 68, so that the trough 68 receives an impingement of the shared path of fluid communication and maintains a pool of sludge comprised of the mixed paint particles and water.

The scrubber unit 24 includes a scrubber pod 70 removably disposed within the mixing chute mouth 64 of the mixing chute 62. The scrubber pod 70 defines a plurality of perforations 72 to induce an initial mixing of the paint particles entrained in the process air into the flow of water and cause a pressure drop as the shared path of fluid communication passes through the plurality of perforations 72. Put another way, the scrubber pod 70 improves mixing of the paint particles in the process air into the flow of water by forcing the paint particles and flow of water into closer proximity with one another as they collectively pass through the plurality of perforations 72 defined by the scrubber pod 70. The plurality of perforations 72 create a pressure drop that helps pull water particles apart and increases the proportion that those smaller water particles will contact paint particles, thus inducing the initial mixing the paint particles into the flow of water. The plurality of perforations 72 further function to increase the uniformity of the initial mixing.

Figure 7:
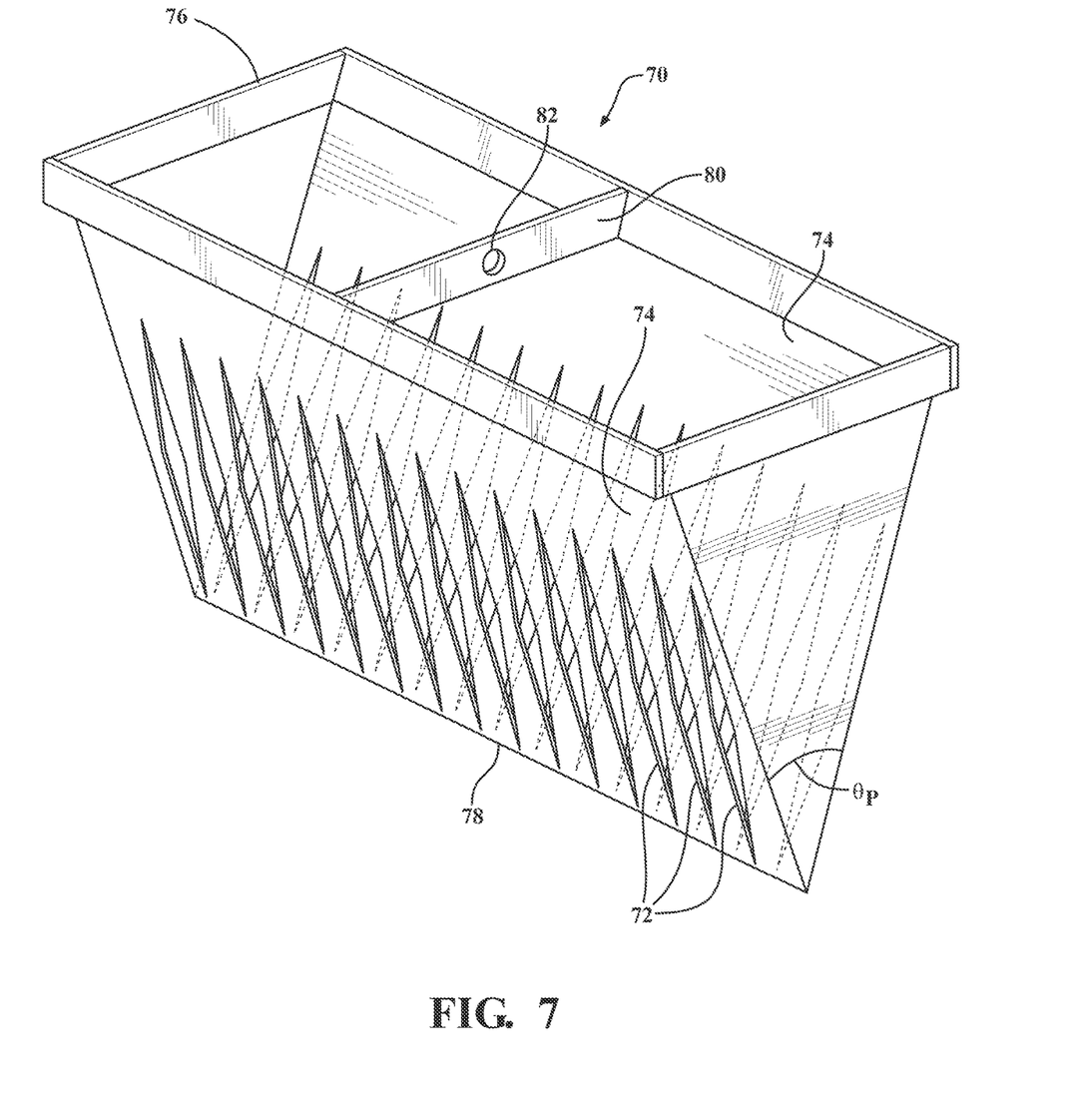
FIG. 7 is a perspective view of a first embodiment of the scrubber pod.
Figure 8:
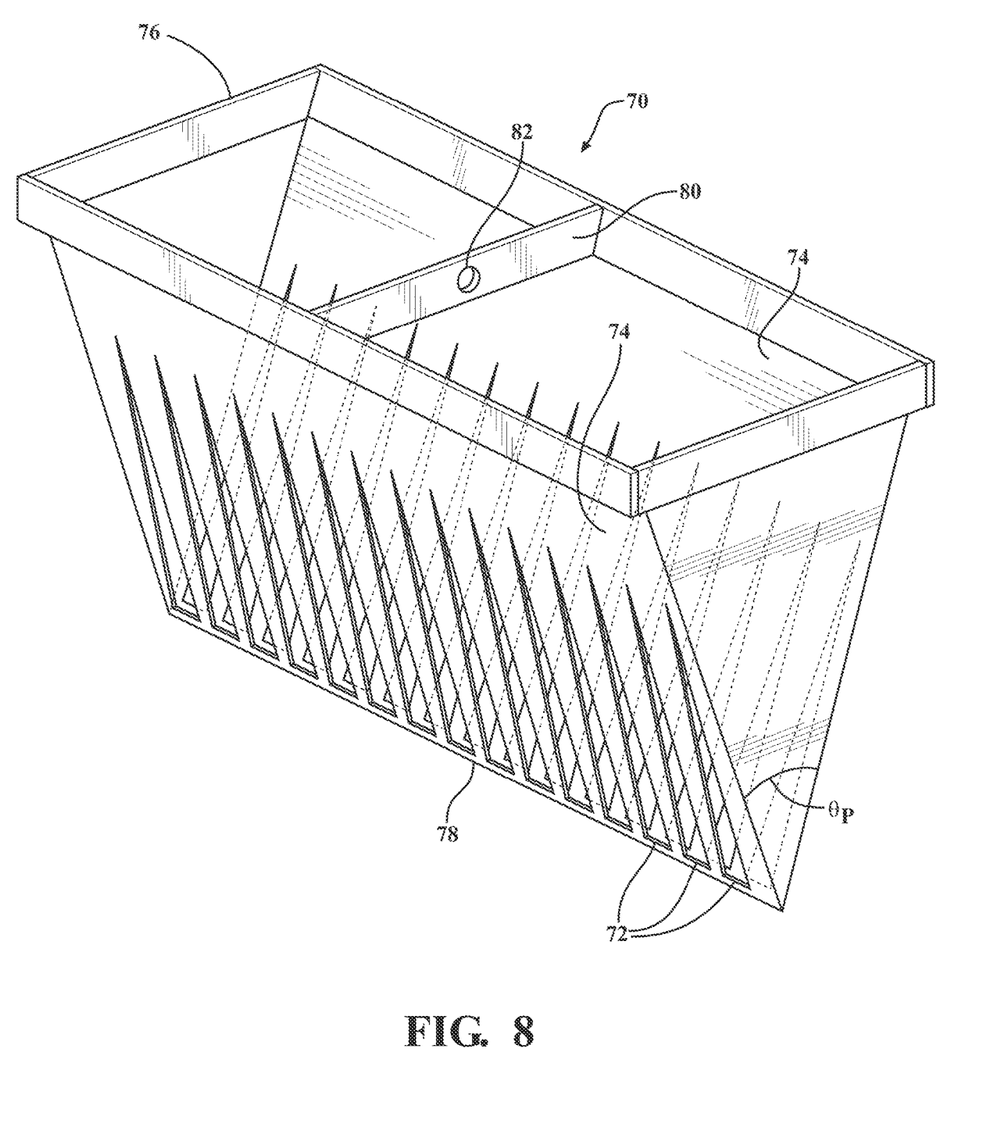
FIG. 8 is a perspective view of a second embodiment of the scrubber pod.

As best illustrated in FIG. 7, in a preferred arrangement, the scrubber pod 70 includes a pair of pod surfaces 74 converging towards one another, preferably at an angle Op of 40°, from a pod top 76 that is open and designed to be in communication with the spray portion 38 to an integral connection along a bottom edge 78. Because of this, the scrubber pod 70 has a generally triangular prism shape. The plurality of perforations 72 are disposed in a series along each of the pod surfaces 74 and each extend longitudinally from the pod top 76 to the bottom edge 78. In a preferred embodiment, as shown best in FIG. 7, the perforations 72 have a rhombus shape. However, FIG. 8 shows an alternative embodiment in which the perforations 72 have a triangular shape. In either arrangement, the scrubber pod 70 includes a lift bar 80 extending centrally between the pod surfaces 74 adjacent the pod top 76. The lift bar preferably 80 has a lift hole 82 for allowing a paint booth operator to remove the scrubber pod 70 from the mixing chute 62 with a hook on a pole. This allows for easy removal and recovery of items blocking the perforations 72 and ease of cleaning of the scrubber pod 70. Further, this allows for ease of replacement if the scrubber pod 70 is damaged or design aspects are changed.

As is best illustrated in FIG. 6, each of the funnels 56 of the scrubber units 24 include four trapezoidal sheets 84 sloping downward from the funnel mouth 58 to the funnel exit 60 to increase the velocity of the flow of process air and the velocity of the flow of water before reaching the scrubber pod 70, improving the mixing action of the paint particles in the downdraft of process air into the flow of water. This also serves to evenly distribute the flow of water to the scrubber pod 70. Further, as best illustrated in FIG. 3, the trapezoidal sheets 60 preferably slope down from the funnel mouth 58 to the funnel exit 60 at an angle $\theta_F$ of 60° relative to the flood sheet 36 to provide a shape of the funnel 56, with the funnel mouth 58 being wider than the funnel exit 60, that improves airflow from the spray portion 38 into the scrubber unit 22. The shape of the funnel 56 also advantageously allows for a reduction in an airflow distance $D_A$ between the flood sheet 36 and conveyed vehicle 32 and paint applicators 42, as shown in FIG. 1, which can be used to reduce the height of the entire paint booth 22, ultimately leading to a reduction in the associated assembly costs and vertical footprint of the paint booth assembly 20.

Figure 4:
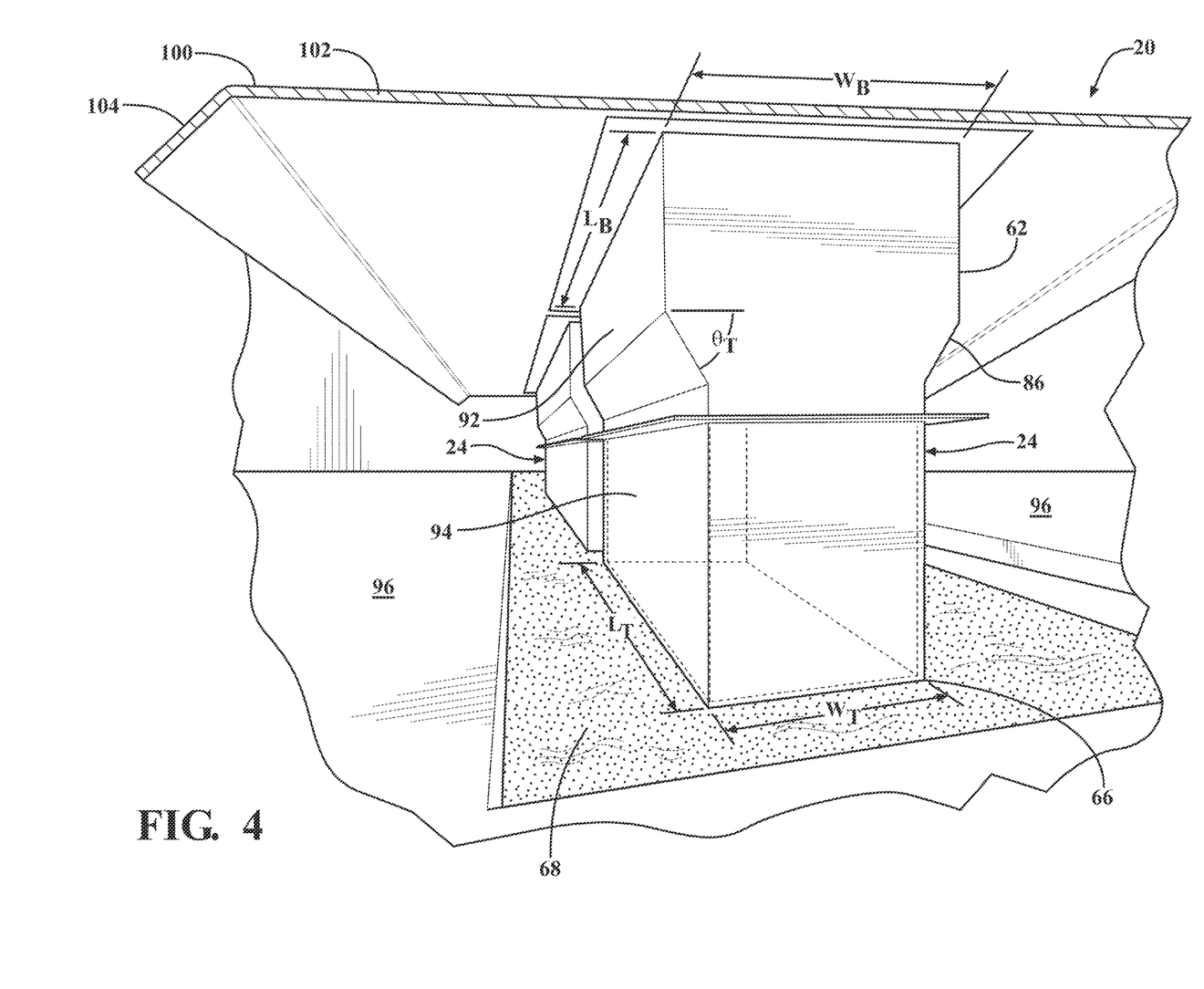
FIG. 4 is a partial perspective cross-sectional view of the paint booth assembly illustrating a throat of the scrubber unit disposed between and narrowing relative to the mixing chute mouth and the mixing chute exit to induce a subsequent mixing of the paint particles entrained in the downdraft of process air into the flow of water.

As best illustrated in FIGS. 3-4, each of the mixing chutes 62 includes a throat 86 disposed in spaced and adjacent relationship with the mixing chute mouth 64 and mixing chute exit 66, to define a body portion 92 of the mixing chute 62 that extends between the mixing chute mouth 64 and the throat 86 and a terminal portion 94 of the mixing chute 62 that extends between the throat 86 and the mixing chute exit 66. The throat 86 narrows from the body portion 92 to the terminal portion 94 to provide for an additional pressure drop and a subsequent mixing of the paint particles in the process air into the flow of water. This also increases the velocity of the impingement of the shared path of fluid communication with the pool of sludge in the trough 68 for establishing a final mixing of the paint particles in the process air into the flow of water. This increased velocity may cause paint particles, being heavier than the air, still entrained within the air that have not entered the water to collide with and enter the pool of sludge in the trough 68, further reducing the amount of paint particles in the air. In the preferred embodiment, the body portion 92 has a body cross-sectional area and the terminal portion 94 has a terminal cross-sectional area that is smaller than the body cross-sectional area, with both the body portion 92 and the terminal portion 94 being rectangular. With reference to FIG. 4, the body portion 92 preferably has a cross-sectional length $L_B$ of 2 feet 3 inches, the terminal portion 94 has a cross-sectional length $L_T$ of 2 feet 3 inches, the body portion 92 has a cross-sectional width $W_B$ of 11 inches, and the terminal portion 94 has a cross-sectional width $W_T$ of 8 inches.

A sloped floor 96 is located in paint recovery portion 40 and extends in a downward slope from the pair of side walls 26 towards the trough 68 for collecting and directing splashed sludge from the impingement back towards the trough 68 within the wet chamber 52. A pair of splash guards 98 extend from the sloped floor 96 and partially covering the trough 68 to contain splashed sludge produced by the impingement within the trough 68.

Figure 5:
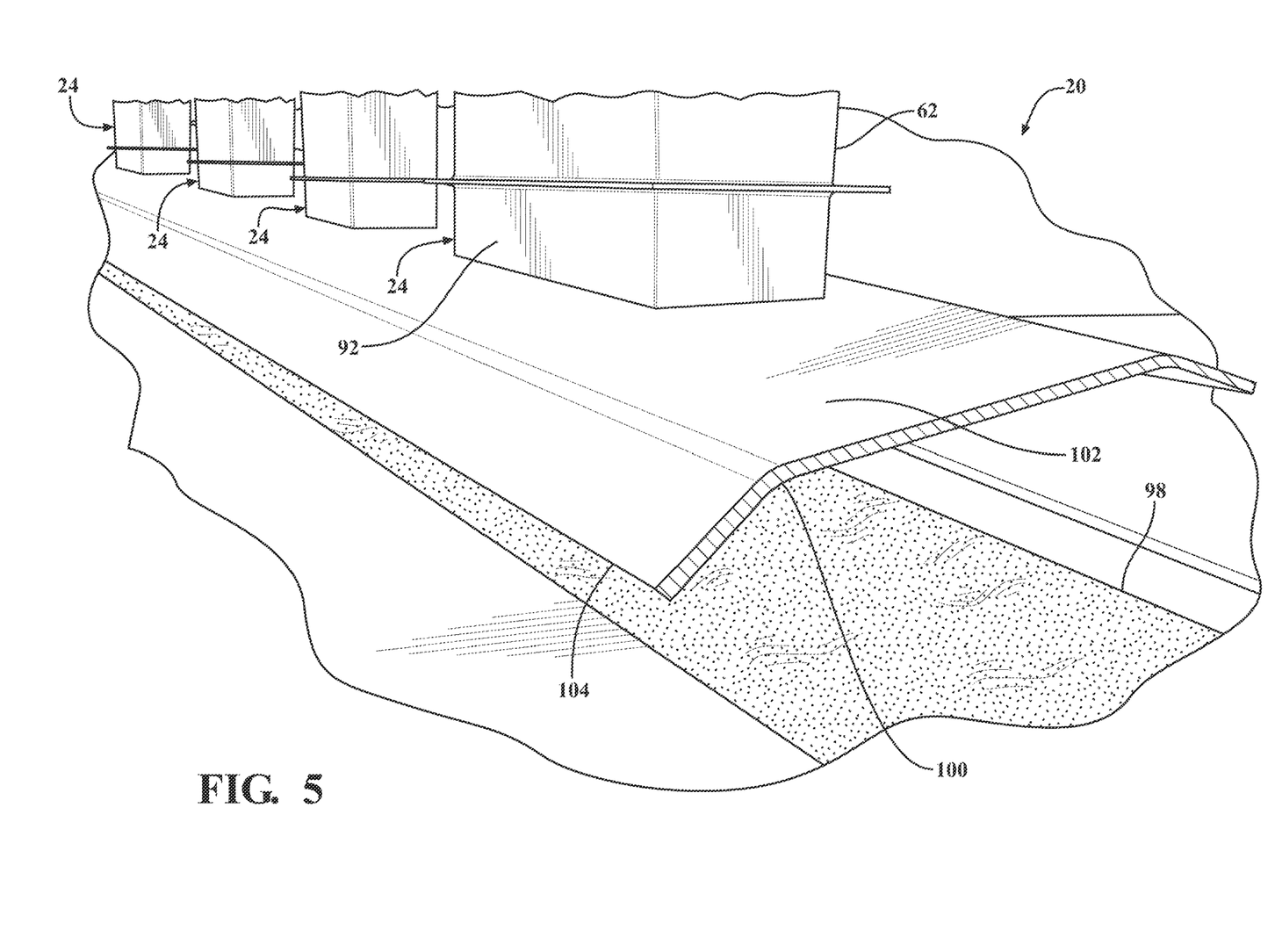
FIG. 5 is a partial perspective cross-sectional view of the paint booth assembly illustrating a deflection skirt of the scrubber unit extending outwardly from and contiguously between a plurality of mixing chutes for containing sludge within a trough.

As best illustrated in FIGS. 3-5, a deflection skirt 100 extends outward from the mixing chute 62 of the at least one scrubber unit 24, and at least partially over the sloped floor 96 to direct the splashed sludge produced by the impingement towards the sloped floor 96. The deflection skirt 100 is preferably formed from a collar 102 extending transverse from the body portion 92 of the mixing chute 62 and a lip 104 sloping down from the collar 102, preferably at an angle $\theta_T$ of 60°. The deflection skirt 100 prevents splashed sludge from reaching the exhaust baffles 108 and from being deposited on surfaces other than the sloped floor 96 within the wet chamber 52, reducing the regularity with which cleaning of the wet chamber 52 is required. The deflection skirt 100 further aids in symmetrically directing the air to the exhaust chambers 54. The constant stream of splashed sludge on the underside of the deflection skirt 100 has the added benefit of cleaning the deflection skirt 100, and the constant stream of splashed sludge on the sloped floor 96 has the added benefit of cleaning the sloped floor 96. The deflection skirt 100 cleaning itself and the sloped floor 96 reduces maintenance labor costs as the deflection skirt 100 and the sloped floor 96 will require manual cleaning less often. In the preferred embodiment, as best illustrated in FIGS. 4 and 5, the deflection skirt 100 extends outward and contiguously from the body portions 92 of all of the mixing chutes 62 from a point near the throats 86. The deflection skirt 100 is also contiguous from the entry end 28 to the exit end 30 to further reduce escape of splashed sludge and reduces machining and assembly complexity.

As best illustrated in FIGS. 1-3, the dividing walls 50 each include and provide support for exhaust baffles 108 to prevent water and paint particles from traveling with the air flowing from the wet chamber 52 to the pair of exhaust chambers 54. The exhaust baffles 108 incorporate sloped retaining plates to shed any water paint particles mixed within the water that reach the baffles back to the wet chamber 52. The exhaust baffles 108 are also located near the top of the dividing walls 50 to allow additional time for water and paint particles to drop out of the exhaust air before entering the exhaust chamber 54. The exhaust baffles 108 improve the cost efficiency of the paint booth 22 by reducing the amount of paint particles that escape the wet chamber 52 and have to be filtered out. Baffle bents provide additional support for the exhaust baffles 108.

The exhaust chambers 54 each include at least one exhaust air connection 110 at one of the ends 28, 30 to allow the downdraft of air traveling from the plenum 44 and serially through the spray portion 38, the wet chamber 52, and the exhaust chambers 54 to exit the paint booth 22. The exhaust air connections 110 are located high on the ends 28, 30 of the exhaust chambers 54 to allow for additional contaminants to drop out of the air, further improving the paint particle capture of the paint booth 22. The exhaust chambers 54 function as ducts and, in cases where there are a total of two exhaust air connections 110, each carries half of full exhaust volume within them and avoids the need and additional cost of having external ducts. In some embodiments, particularly for longer paint booths 20, such as those that measure 120 feet or more from entry end 28 to exit end 30, there will be a total of four exhaust air connections 110, one at each end for both exhaust chambers 54. Prior to air leaving through the exhaust air connections 110, the air slows down relative to its velocity at the exhaust baffles 108, allowing for additional paint particles and contaminants to drop out of the air. This further improves the paint particle capture of the paint booth 22 and improves cost efficiency by reducing how often filters need to be replaced.

With further reference to FIG. 2, the exhaust chambers 54 of the paint booth assembly 20 preferably split exhaust air into two exhaust chambers 54 to allow for a reduction in the height of the paint booth 22 relative to using one exhaust chamber 54, with associated cost savings. Splitting the exhaust air into two exhaust chambers 54 provides a further reduction in air speed velocity which provides further opportunity for water and paint particles to drop out of the exhaust air, increasing the capture efficiency of the paint booth 22. If the paint booth is longer than 120 feet, the dividing walls 50 can incorporate adjustable plates to control air distribution within the exhaust chambers 54. Dividing wall sumps 106 function as air locks between the exhaust chambers 54 and the wet chamber 52 and allow cleaning solutions to flow from the exhaust chambers 54 to the wet chamber 52. The exhaust chambers 54 have smooth surfaces for ease of cleaning and to reduce the deposition of material on non-floor surfaces within the exhaust chambers 54.

As further illustrated in FIG. 2, the water distribution system 47 includes water distribution headers 112 that provide water to the flood sheet 36. Reduction pipes 114 in fluid connection with the water distribution headers 112 increase the velocity of the flow of water and reduce scale accumulation. Water entry fittings 116 in fluid connection with the reduction pipes 114 direct water to water entry boxes 118 located near the side walls 26 and on the flood sheet 36 to reduce the kinetic energy of the flow of water and distribute the flow of water evenly across the flood sheet 36. The water entry boxes 118 each include a hinge that allows the entry boxes to flip up and open to allow for ease of cleaning. A level adjustment lip 120 that is 2.5 inches in height surrounds each of the flood sheet openings 48 to maintain a desired water level on the flood sheet 36 and maintain even distribution of the flow of water into the scrubber unit 24. A flood sheet drain box 122 with an extended handle 124 allows for draining of the flood sheet 36 for cleaning.

A series of grates 126 extend between the pair of side walls 26 and the entry and exit ends 28, 30 in spaced and generally parallel relationship above the flood sheet 36 to allow a paint booth 22 operator to move about the spray portion 38 of the paint booth 22 and access and service the paint applicators 42. The grates 126 can be removed to provide access to the flood sheet 36. A conveyor support 128 extends from each of the side walls to provide structural support to the conveyor 34 and the grates 126.

Although not illustrated, at least one wet chamber access door can be located 20 in the wet chamber 52 at one of the ends 28, 30 of the paint booth 22 to provide access to the wet chamber 52 for maintenance and cleaning. The access door is designed to be water tight and utilizes marine style hinges and locks to accomplish this. A sludge system is in fluid communication with the trough 68 for receiving and filtering paint particles out of the sludge. The trough 68 is generally sloped to direct sludge toward the sludge system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A scrubber unit for receiving a shared path of fluid communication of a flow of water from a flood sheet and a downdraft of process air containing air and paint particles from a spray portion of a paint booth, the scrubber unit comprising:
   a mixing chute extending downwardly from a mixing chute mouth to a mixing chute exit for establishing a residence time for the shared path of fluid communication to allow a mixing of the paint particles entrained in the process air into the flow of water; and
   a scrubber pod removably disposed within said mixing chute and extending from a pod top being open adjacent said mixing chute mouth to a pod bottom being closed along a bottom edge; and
   said scrubber pod defining a plurality of perforations disposed between said pod top and said pod bottom to induce an initial mixing of the paint particles entrained in the downdraft of process air into the flow of water during an early portion of the residence time of the shared path of fluid communication in said mixing chute.

2. The scrubber unit of claim 1, wherein said scrubber pod includes a pair of pod surfaces converging towards one another from said pod top to an integral connection extending along said bottom edge to establish said closed pod bottom and define a generally triangular prism shape for said scrubber pod.

3. The scrubber unit of claim 2, wherein said plurality of perforations are disposed in a series along each of said pair of pod surfaces and extend longitudinally from adjacent said pod top to adjacent said bottom edge, and each of said plurality of perforations having a rhombus shape.

4. The scrubber unit of claim 1 further comprising:
   said mixing chute including a throat disposed between said mixing chute mouth and said mixing chute exit to define a body portion of said mixing chute extending between said mixing chute mouth and said throat and a terminal portion of said mixing chute extending between said throat and said mixing chute exit; and
   said throat narrowing from said body portion to said terminal portion for increasing a velocity of the flow of water and the process air in the mixing chute to induce a subsequent mixing of the paint particles entrained in the downdraft of process air into the flow of water.

5. The scrubber unit of claim 4 further comprising:
   a deflection skirt extending outwardly from said body portion of said mixing chute and including a collar extending transverse from said body portion of said mixing chute and a lip sloping downwardly from said collar.

6. The scrubber unit of claim 1 further comprising:
   a funnel extending downwardly from a funnel mouth to a funnel exit disposed adjacent said mixing chute mouth; and
   said funnel having four trapezoidal sheets sloping downward from said funnel mouth to said funnel exit for increasing a velocity of the downdraft of process air and the flow of water approaching said scrubber pod.

\* \* \* \* \*